US012170456B2

United States Patent
Yu et al.

(10) Patent No.: US 12,170,456 B2
(45) Date of Patent: Dec. 17, 2024

(54) CONTROL OF VEHICLE AND HOME ENERGY STORAGE SYSTEMS

(71) Applicant: FORD GLOBAL TECHNOLOGIES, LLC, Dearborn, MI (US)

(72) Inventors: Lan Yu, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 17/989,842

(22) Filed: Nov. 18, 2022

(65) Prior Publication Data

US 2024/0170988 A1 May 23, 2024

(51) Int. Cl.
| | | |
|---|---|---|
| H02J 7/00 | (2006.01) | |
| B60L 53/62 | (2019.01) | |
| B60L 53/64 | (2019.01) | |
| H02J 3/00 | (2006.01) | |
| H02J 3/32 | (2006.01) | |
| H02J 3/38 | (2006.01) | |

(52) U.S. Cl.
CPC .......... *H02J 7/00712* (2020.01); *B60L 53/62* (2019.02); *B60L 53/64* (2019.02); *H02J 3/003* (2020.01); *H02J 3/322* (2020.01); *H02J 3/381* (2013.01); *H02J 7/0049* (2020.01); *H02J 2300/22* (2020.01)

(58) Field of Classification Search
CPC ........ H02J 7/00712; H02J 3/003; H02J 3/322; H02J 3/381; H02J 7/0049; H02J 2300/22; B60L 53/62; B60L 53/64
USPC .......................................................... 307/26
See application file for complete search history.

(56) References Cited

U.S. PATENT DOCUMENTS

| | | | |
|---|---|---|---|
| 8,718,850 B2 | 5/2014 | Bozchalui et al. | |
| 9,843,189 B2 | 12/2017 | Kamalasadan et al. | |
| 10,338,622 B2 | 7/2019 | Nakasone | |
| 2013/0024035 A1 | 1/2013 | Ito et al. | |
| 2016/0006246 A1* | 1/2016 | Yano | H02J 3/32 320/128 |
| 2018/0022228 A1* | 1/2018 | Mazaira | B60L 53/64 320/109 |
| 2018/0037121 A1 | 2/2018 | Narla | |
| 2020/0161859 A1 | 5/2020 | Bell | |
| 2023/0038882 A1* | 2/2023 | Zhao | H02J 7/0048 |

FOREIGN PATENT DOCUMENTS

KR        102118355 B1    6/2020

OTHER PUBLICATIONS

Non-final office action of U.S. Appl. No. 17/989,827 mailed Mar. 5, 2024, 15 pages.

* cited by examiner

Primary Examiner — Richard Tan
(74) Attorney, Agent, or Firm — David B. Kelley; Brooks Kushman P.C.

(57) ABSTRACT

An energy system of a building includes a power storage device, and a controller that, during a period of time for which energy costs are lowest, charges a power storage device to a maximum state of charge, and during a period of time for which energy costs are not lowest and an immediate subsequent period of time is predicted to have higher energy costs, charges the power storage device to a target state of charge that is less than the maximum state of charge and that depends on predicted power demand during the subsequent period of time.

14 Claims, 7 Drawing Sheets

CONTROL OF VEHICLE AND HOME ENERGY STORAGE SYSTEMS

TECHNICAL FIELD

The present disclosure relates to systems for coordinating electric energy storage between various entities.

BACKGROUND

Utility companies may offer variable electricity rates based on the time of day. A home energy ecosystem (HEE) may include energy storage devices such as home energy storage (HES), an electric vehicle battery or the like. The stored electricity may be used to power various devices such as appliances, AC systems and other devices. Operation of the HEE may be controlled via a home energy management system (HEMS).

SUMMARY

An energy system of a building includes a power storage device, and a controller that, during a period of time for which energy costs are lowest, charges a power storage device to a maximum state of charge, and during a period of time for which energy costs are not lowest and an immediate subsequent period of time is predicted to have higher energy costs, charges the power storage device to a target state of charge that is less than the maximum state of charge and that depends on predicted power demand during the subsequent period of time.

A method includes, during a period of time for which energy costs are lowest, charging a power storage device to a maximum state of charge, and during a period of time for which energy costs are not lowest and an immediate subsequent period of time is expected to have lower energy costs, precluding charging of the power storage device.

An energy system for a building includes one or more power storage devices and one or more controllers that, responsive to receiving a plurality of energy prices for a plurality of future periods, operates the one or more power storage devices such that energy stored in the one or more power storage devices is greater than a target minimum energy at a start of each of the periods, wherein the target minimum energy at a start of each of the periods is based on the energy prices and predicted power demands during the one or more future periods.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
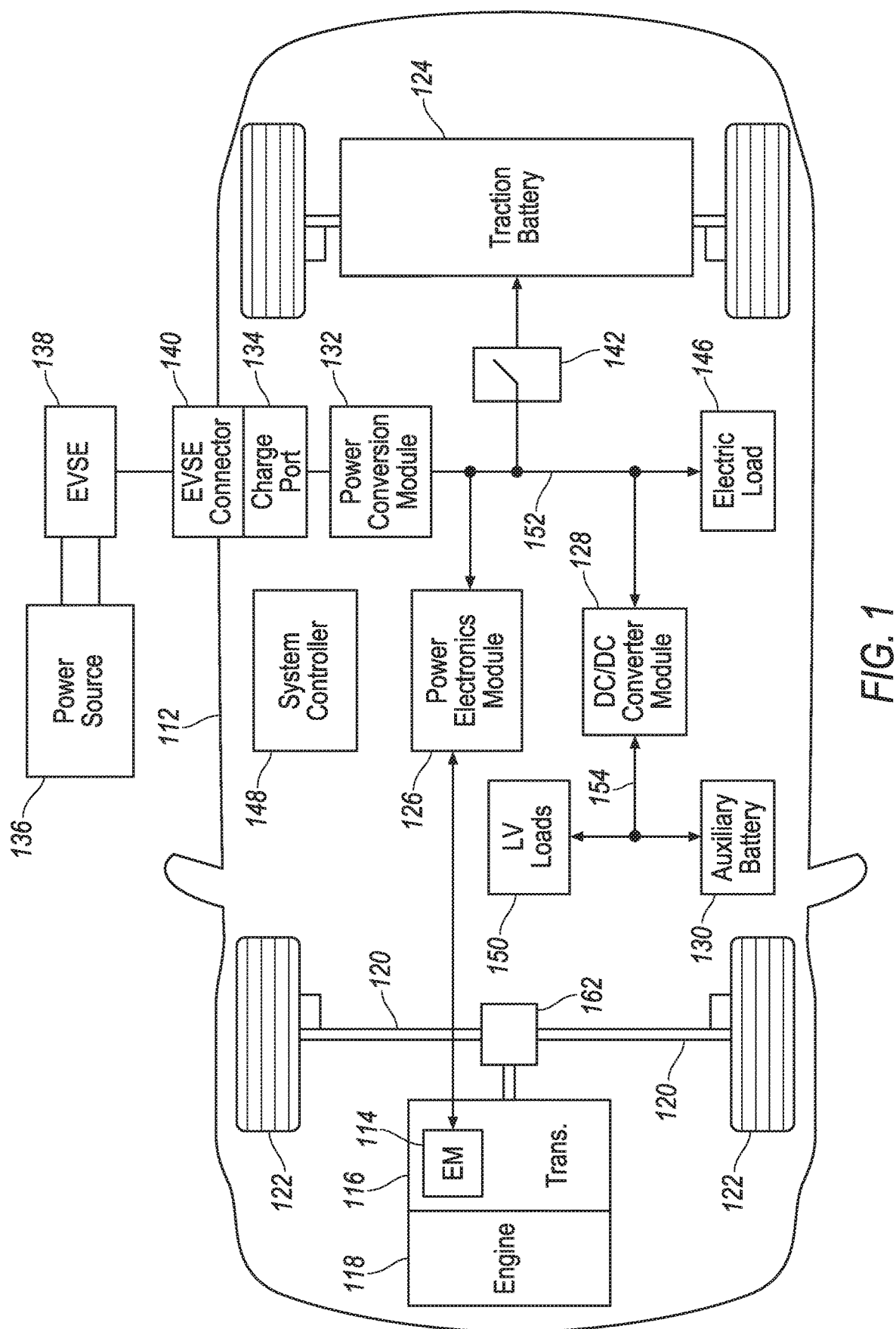
FIG. 1 is a diagram of an electrified vehicle illustrating drivetrain and energy storage components including an electric machine.

FIG. 1 depicts an electrified vehicle 112 that may be referred to as a plug-in hybrid-electric vehicle (PHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a Battery Electric Vehicle (BEV). In a BEV configuration, the engine 118 may not be present.

A traction battery or battery pack 124 stores energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 142 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus/rail. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to recharge the traction battery 124 from an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling. Additionally, the vehicle 112 may be configured to provide electric power from the traction battery 124 to off-board power storage and/or a power grid (not shown) via the EVSE 138 and EVSE connection 140 under the control of controllers such as the power conversion module 132 or one or more remote controllers such as a cloud server (not shown). Alternatively, the power transfer from the traction battery 124 to the off-board load (e.g. the HES) may be performed without utilizing the power conversion module 132 since both the traction battery 124 and the HES are DC power. Transferring from the traction battery 124 to the power grid may require utilizing the power conversion module 132 as the power grid may be on AC power only. The traction battery 124 may be directly connected to the charge port to transfer and/or receive DC power. For instance, the EVSE 138 may be integrated or associated with a home having a HES as power backup. The vehicle 112 may be operated as a portable power storage to transfer power from and to the HES coordinated by a HEMS (to be described in detail below).

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by the Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
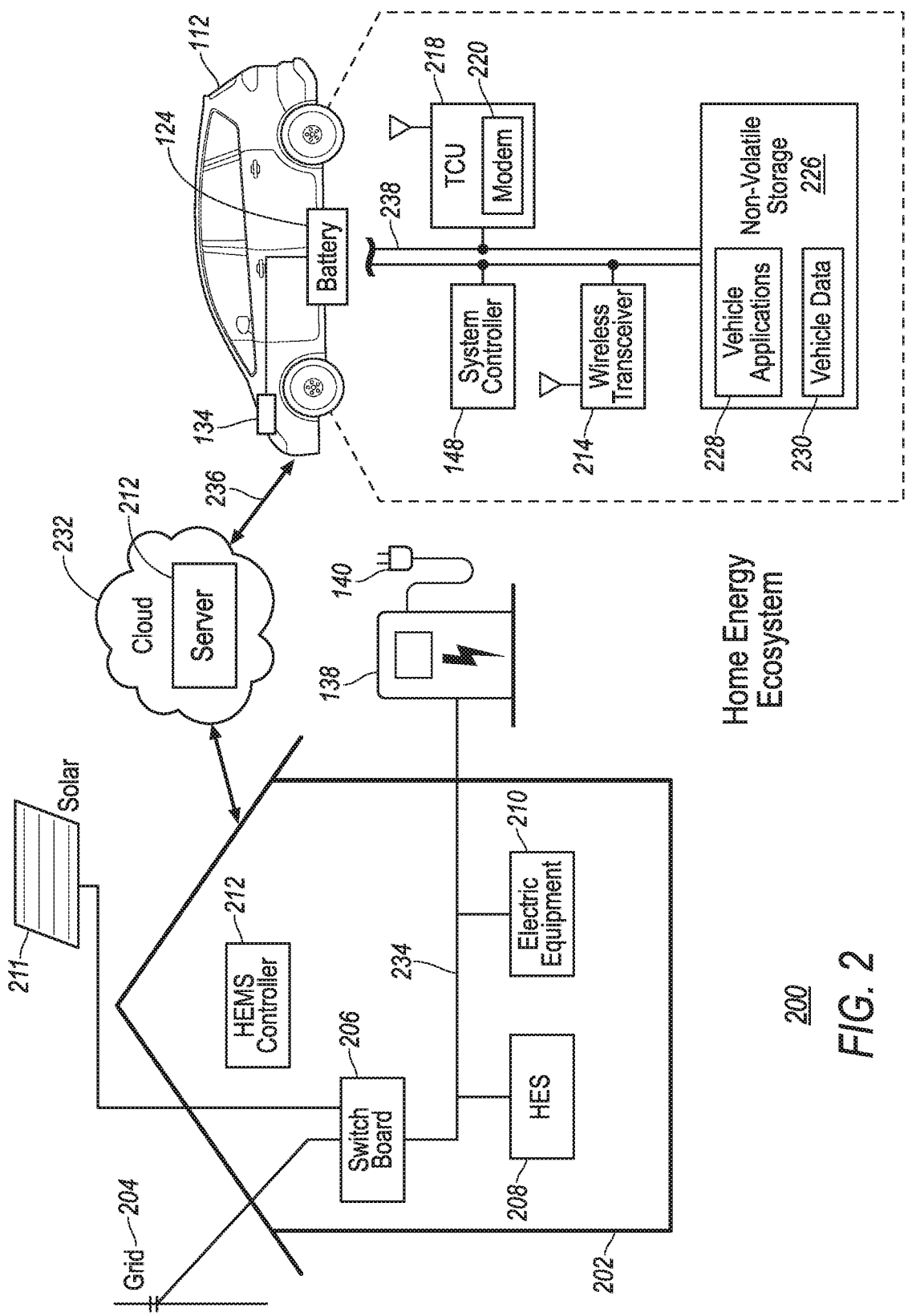
FIG. 2 is a diagram of a HEMS associated with an electric vehicle.

FIG. 2 depicts a diagram of a home energy management system associated with an electric vehicle. A home energy ecosystem (HEE) 200 in the present example may be implemented for a house/building 202. The house 202 may access electric power from a power grid 204 via a switch board 206 configured to provide various components of the HEE 200 with electric power via an internal powerline 234. For instance, the HEE 200 may include one or more electric equipment 210 (e.g. appliance) configured to consume electricity and provide various features to the household. The HEE 200 may further include a HES 208 configured to store electric energy. The HES 208 may be implemented in various forms. As an example, the HES 208 may include a rechargeable battery (e.g. lithium-ion battery) to store electric energy received from the grid 204 (or other sources) and to provide the electric energy to the internal powerline 234 whenever needed. Since the electric energy may be stored as DC power in the HES 208, one or more DC/AC inverters may be provided with the HES 208 for power transitions. The house 202 may be further connected to a solar panel 211 via the switch board 206. The solar panel 211 may be configured to generate and supply electric power to the HES 208 via the internal power line 234. The solar panel 211 may generate a DC electric power having a voltage that is the same or different from the voltage of the HES 208. In one example, the solar panel 211 may be configured to charge the HES 208 via one or more DC/DC converters. Alternatively, one or more DC/AC inverters may be provided with the solar panel 211 and/or the switch board for power transitions. It is noted that although the solar panel 211 is provided to the house 202 for electric power generating in the present embodiment, the present disclosure is not limited thereto. In other words, the house 202 may be provided with other means of power generating capabilities such as a wind turbine or the like.

With continuing reference to FIG. 1, the internal powerline 234 may be further connected to an EVSE 138 configured to transfer electric energy with the electric vehicle 112. The EVSE 138 may be installed within or near the house 202 (e.g. in a garage) and adapted to a home electric energy configuration having a predefined voltage and maximum current supported by the switch board 206. As discussed with reference to FIG. 1, the EVSE 138 may be configured to connect to the vehicle 112 via the charge port 134 to charge the traction battery 124. Additionally, the EVSE 138 may be further configured to draw electric power from the traction battery 124 of the vehicle 112 to supply power to the HEE 200 or the grid 204. For instance, the EVSE 138 may be configured to draw electric power from the vehicle 112 and the HES 208 to power the components of the house 202 during peak hours when the electricity price is high to avoid paying a premium to the utility company.

The power management of the HEE 200 may be controlled and coordinated by a HEMS controller 212 associated with the house 202. The HEMS controller 212 may be implemented in various manners. For instance, the HEMS controller 212 may be a dedicated controller located within the house 202 and connected to components of the home energy ecosystem or smart home devices HEE 200 via wired or wireless connections (not shown). Alternatively, the HEMS controller 212 may be remotely implemented via a cloud server 232 through the Internet and configured to remotely monitor and control the operations of components of the HEE 200. In any or all of the above implementation examples, the HEMS controller 212 may be provided with software to monitor and control the operations of the various components of the home energy ecosystem HEE 200. The HEMS controller 212 may be further provided with an interface associated with input and output devices to interact with a user of the HEE 200. The HEMS 212 may be further connected to a cloud 232 via a public or private network to communicate with other entities such as the utility company to facilitate the planning and controlling of the HEE 200. For instance, the HEMS 212 may be configured to operate the charging and discharging of the HES 208 and battery 124 of the vehicle 112 based on the current and/or predicted electricity price received from an entity (e.g. utility company) via the cloud 232. In one example, the HEMS controller 212 may be implemented via the cloud server 232 through software without dedicated hardware structure for the house 202. It is noted that the term cloud 232 recited in the present disclosure is used as a general term and may include any computing network involving carriers, router, computers, controllers, circuitries, servers or the like configured to store data and perform data processing functions and facilitate communication between various entities.

With continuing reference to FIG. 1, the vehicle 112 may further include various components to facilitate the power transaction between the battery 124, the EVSE 138 and the grid 204. The vehicle 112 may include a system controller 148 configured to perform instructions, commands and other routines in support of the processes described herein. For instance, the system controller 148 may include one or more processors and be configured to execute instructions of vehicle application 228 to provide features such as wireless communication and power management. Such instructions and other data may be maintained in a non-volatile manner using a variety of computer-readable storage medium 226 as a part of vehicle applications 228 and vehicle data 230. The computer-readable medium 226 (also referred to as a processor-readable medium or storage) may include any non-transitory medium (e.g. tangible medium) that participates in providing instructions or other data that may be used by the system controller 148. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and structured query language (SQL).

The vehicle 112 may be further configured to wirelessly communicate with a variety of digital entities via a wireless transceiver 214. For instance, the vehicle 112 may be configured to communicate with the HEMS controller 212 (local or remote) via the wireless transceiver 214 to perform various operations. Additionally or alternatively, the communication between the vehicle 112 and the HEMS controller may be enabled by the EVSE connector 140 coupled with the charge port 134 configured to support digital communication protocols. The wireless transceiver 214 may be configured to support a variety of wireless communication protocols enabled by wireless controllers (not shown) in communication with the wireless transceiver 214. As a few non-limiting examples, the wireless controllers may include a Wi-Fi controller, a Bluetooth controller, a radio-frequency identification (RFID) controller, a near-field communication (NFC) controller, and other devices such as a Zigbee transceiver, an IrDA transceiver, an ultra-wide band (UWB) transceiver, or the like.

The vehicle 112 may be further provided with a telematics control unit (TCU) 218 configured to control telecommunication between the vehicle 112 and the cloud 232 through a wireless connection 236 using a modem 220. The wireless connection 236 may be in the form of various communication networks (e.g. cellular network). Through the wireless connection 236, the vehicle 112 may access one or more servers 213 of the cloud 232 to access various content for various purposes. The various components of the vehicle 112 introduced above may be connected to each other via in-vehicle network 238. The in-vehicle network 238 may include, but is not limited to, one or more of a controller area network (CAN), an Ethernet network, and a media-oriented system transport (MOST), as some examples.

Figure 3:
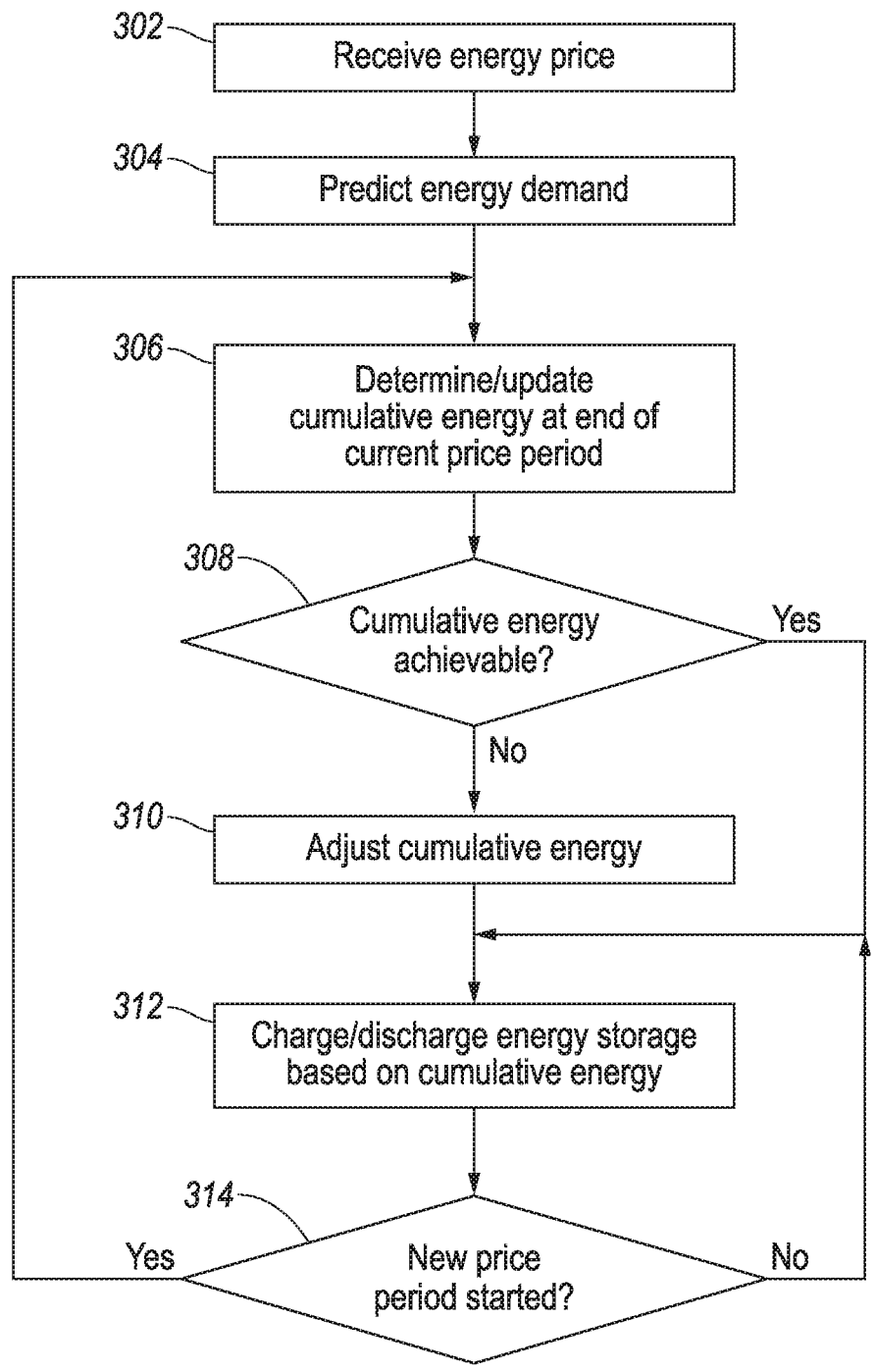
FIG. 3 is flow diagram of a process for operating the HEE based on energy price.

The HEMS controller 212 may be configured to control and coordinate the energy distribution of the house 202 based on various factors. For instance, the HEMS controller 212 may be configured to store a cumulative energy by charging the HES 208 and/or the vehicle battery 124 when the electricity price is low to accommodate a future demand when the electricity price is high such that utility bills of the household may be reduced. Referring to FIG. 3, an example flow diagram of a process 300 for operating the HEE based on energy price is illustrated. With continuing reference to FIGS. 1-2, the process 300 may be individually or collectively implemented via the local HEMS controller 212, the remote server 213, and/or the system controller 124 of the vehicle 112. For simplicity, the following description will be made with reference to the local HEMS controller 212. At operation 302 the HEMS controller 212 receives future energy prices for a predefined period of time from the cloud 232. In the present example, the energy prices may include the electricity prices although the present disclosure is not limited thereto. Other types of energy may be applied to the present disclosure under essentially the same concept. For instance, the energy price may include hydrogen prices, natural gas prices in additional to or in lieu of the electricity prices. The energy prices may be provided by the utility company to cover a predefined period of time in the future. For instance, the energy price may cover a total duration of 24 hours. The specific energy price may vary during the total duration. Therefore, the total duration may be subdivided into a plurality of periods each corresponding to a specific price until the next period when a new price becomes in effect.

At operation 304, the HEMS controller 212 predicts an energy demand of the HEE in the future time period corresponding to the future energy prices as received. The HEMS controller 212 may predict the energy demand using various factors. As a few non-limiting examples, the HEMS controller 212 may predict the energy demand based on the state of charge of the vehicle battery 124 and a planned trip of the vehicle 112 to determine an amount of charge for charging the vehicle 112 and time when the charging needs to complete. The HEMS controller 212 may further predict the energy demand based on historical data indicative of the past energy consumption throughout a period of time (e.g. a day). At operation 306, the HEMS controller 212 determines a target cumulative energy amount at the end of each period of the total duration. The target cumulative energy amount may be indicative of a minimum amount designated to satisfy the power demand during one or more following time period when the energy price is above a threshold and drawing power from the grid is preferably avoided. As discussed above, the HEE 200 is configured to accumulate the energy when the energy price is below a threshold and use the accumulated energy when the price is above the threshold. In an example, the current energy price may be used as the threshold. Alternatively, one or more low price points of the future energy prices received may be used as the threshold to determine whether the energy storages are to be charged or discharged.

With the target cumulative energy determined, at operation 308, the HEMS controller 212 verifies if the target cumulative energy can be achieved under the energy capacity and/or power limitations of the HEE 200. For instance, the HEMS controller may verify if the target cumulative energy exceeds the storage capacity and power limit of the HEE during the predicted period of time. The HES 208 and the vehicle battery 124 are associated with limited electric energy storage capacity, and the vehicle 112 may be unplugged and unavailable for storing the cumulative power during a part of the total duration. In addition, even if the total energy storage amount is sufficient to store the target cumulative power, charging and discharging power limits of the HES 208 and the vehicle battery 124 may prohibit the HEE 200 from totally relying on the cumulative energy without drawing any power from the grid 204 in the future. If either of the storage capacity or power limit is exceeded, which is indicative of the target cumulative energy being unachievable, the process proceeds from operation 308 to operation 310 and the HEMS controller 212 adjusts the cumulative energy amount using the capacity and/or power limit. Otherwise, if the target cumulative energy is achievable, the process proceeds to operation 312 and the HEMS controller 212 sets the cumulative energy as the target for the current electricity price period and starts charging/discharging the energy storage devices based on the target. At operation 314, responsive to detecting the expiration of the current price period, the process returns to operation 306 to update the target cumulative energy for the next price period.

The operations of process 300 may be applied to various situations. Referring to FIG. 4A-4D, data diagrams of an example of the present disclosure are illustrated. More specifically, the data diagrams include a price diagram 402 illustrating the energy price, a power diagram 404 illustrating the predicted power demand, and an energy diagram 406 illustrating the target cumulative energy. The three data diagrams 402-406 correspond to each other in the horizontal axis indicative of time over a total future period of 24 hours in the present example. As illustrated in the price diagram 402, the energy price received from the server 212 for the total duration of 24 hours may be divided into a plurality of periods each corresponding to a different energy price value. For instance, the total 24 hour price period may include a first period 408 from 12 AM to 7 AM at the energy price about 0.05 dollar/kWh, a second period 410 from 7 AM to 3 PM (i.e. 15 o'clock) at the energy price about 0.1 dollar/kWh, a third period 412 from 3 PM to 7 PM (i.e. 19 o'clock) at the energy price about 0.15 dollar/kWh, a fourth period 414 from 7 PM to 11 PM (i.e. 23 o'clock) at the energy price about 0.1 dollar/kWh, and a fifth period 416 from 11 PM to 12 AM the next day at the energy price about 0.05 dollar/kWh. With the future energy price determined, the target of the HEE 200 is to charge the energy storage devices between 11 PM to 7 AM when the energy price is relatively low to accommodate the power demand as much as possible between 7 AM to 11 PM when the price is relatively high. In other words, the HEMS controller 212 may be configured to charge the power storage devices during the first period 408 and fifth period 416, and discharge the power storage devices during the second, third, and fourth periods 410, 412, 414. Although the fifth period 416 is labeled separately in the present example, it is also possible that the fifth period 416 may be combined with the first period 408 of the next day into a single period in an alternative example.

Referring to the power diagram 404, the predicted power demand throughout the 24-hour total period may be divided into two sections according to the energy price. The predicted power demand may be divided into a charging section 418 (unshaded) corresponding to the first and fifth periods 408, 416 during which the energy price is low and the energy storage devices should be charged, and a discharging section 420 (shaded) corresponding to the second, third and fourth periods 410, 412, 414 during which the energy price is high and the HEE 200 is to draw power from the energy storage devices. In the present example, the discharging section 402 starts from 7 AM until 11 PM. The HEMS controller 212 may determine an amount of predicted energy consumption at each period during the discharging section 420 and therefore determine the target cumulative energy at the end of each period sufficient to accommodate one or more subsequent periods when the energy price is high. For instance, since the HEE 200 is set to draw power from the power storage devices from 7 AM, the target minimum cumulative energy needs to be reached before the power drawing starts. Referring to the energy diagram 406, in the present example, a target cumulative energy of 32 kWh by 7 AM is calculated to accommodate all or a part of the upcoming energy discharging periods. The HEMS 212 operates the power storage devices such as the HES 208 and the traction battery 124 based on the target. Here, it is noted depending on the specific operating condition of the power storage devices, the HEE 200 may or may not achieve the target cumulative energy by the end of the first period. If the target is not achieved, drawing power from the grid during the high price periods may be inevitable.

Figure 4A:
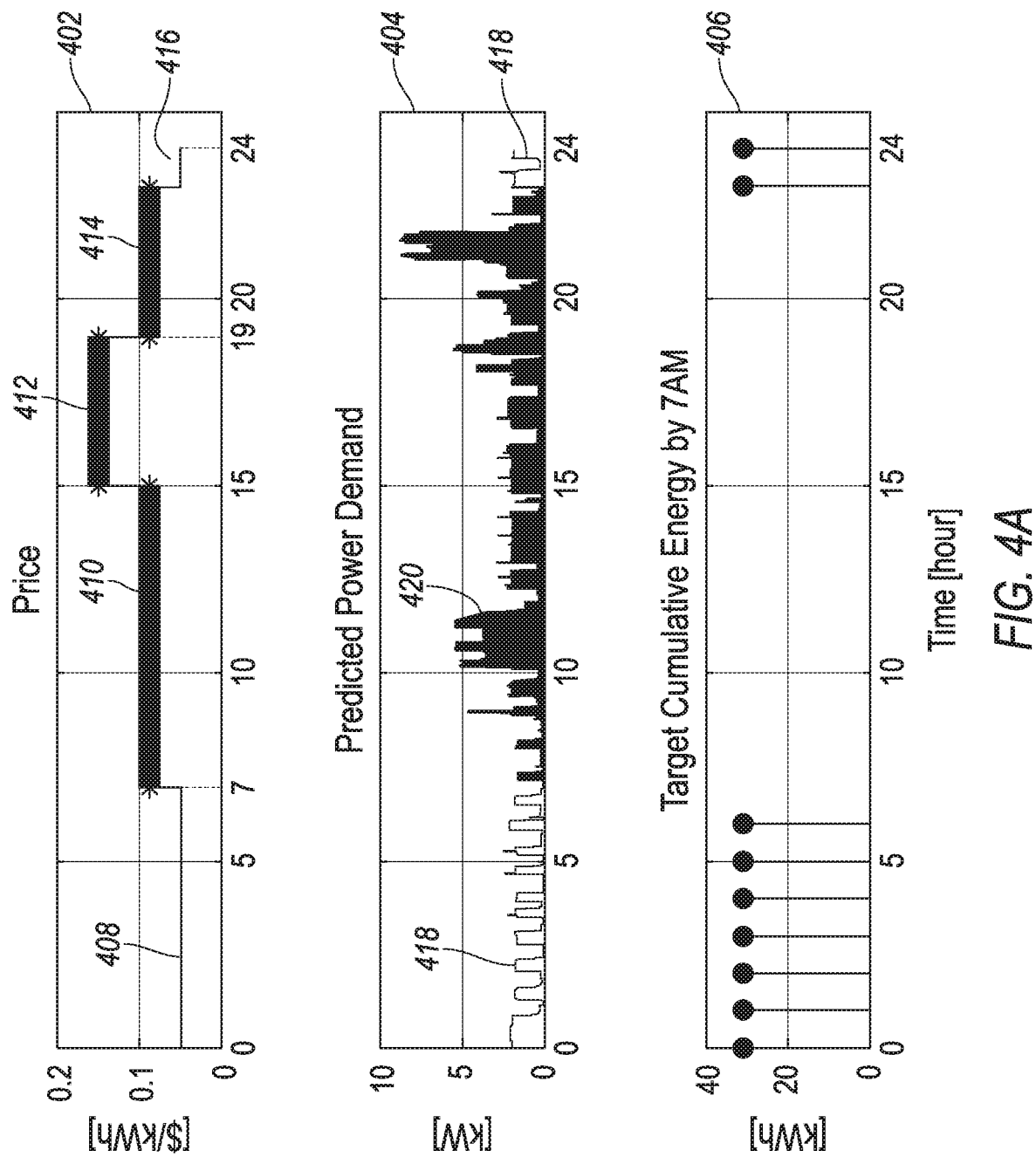
FIGS. 4A to 4D illustrate data diagrams of the energy price, predicted power demand and target cumulative energy of one embodiment of the present disclosure.
Figure 4B:
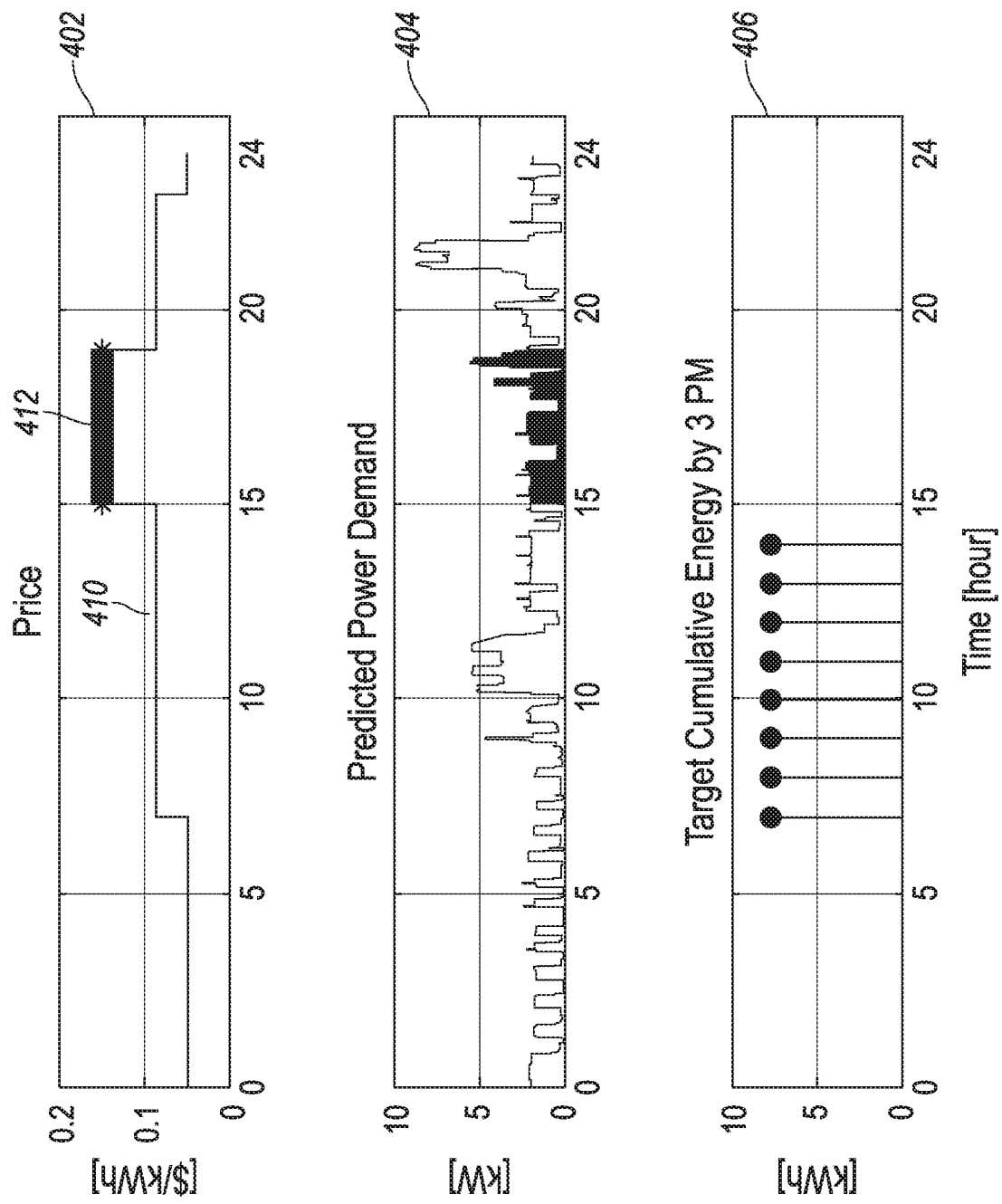

Referring to FIG. 4B, as the time elapses, the HEE 200 draws power from the power storage devices during the second period 410. However, since the energy price will be the highest during the upcoming third period 412, the HEE 200 may not be allowed to deplete the energy from the storage devices during the current period 410. Instead, the HEMS controller 212 sets a target cumulative energy indicative of a minimum amount of energy sufficient to accommodate at least the power demand during the third period 412. If additional energy is available, the HEMS controller 212 may set the target cumulative energy at the end of the second period (i.e. 3 PM) to further accommodate power demand during the fourth period 414. However, this further accommodation may be unnecessary since the energy price during the current second period 410 is the same as during the upcoming fourth period 414 and thus drawing power from the grid during these two periods may incur the same cost. Other factors may help determine whether and how much energy needs to be accumulated to prepare for the energy usage at the fourth period 414, such as the demand prediction accuracy etc. As illustrated in the energy diagram 406 in FIG. 4B, the target cumulative energy by the beginning of the third period (i.e. 3 PM) is around 8 kWh. The HEMS controller 212 may supply power from the power storage devices to the power equipment until the storage reduces to the target and supplies any further power demand using grid power.

Figure 4C:
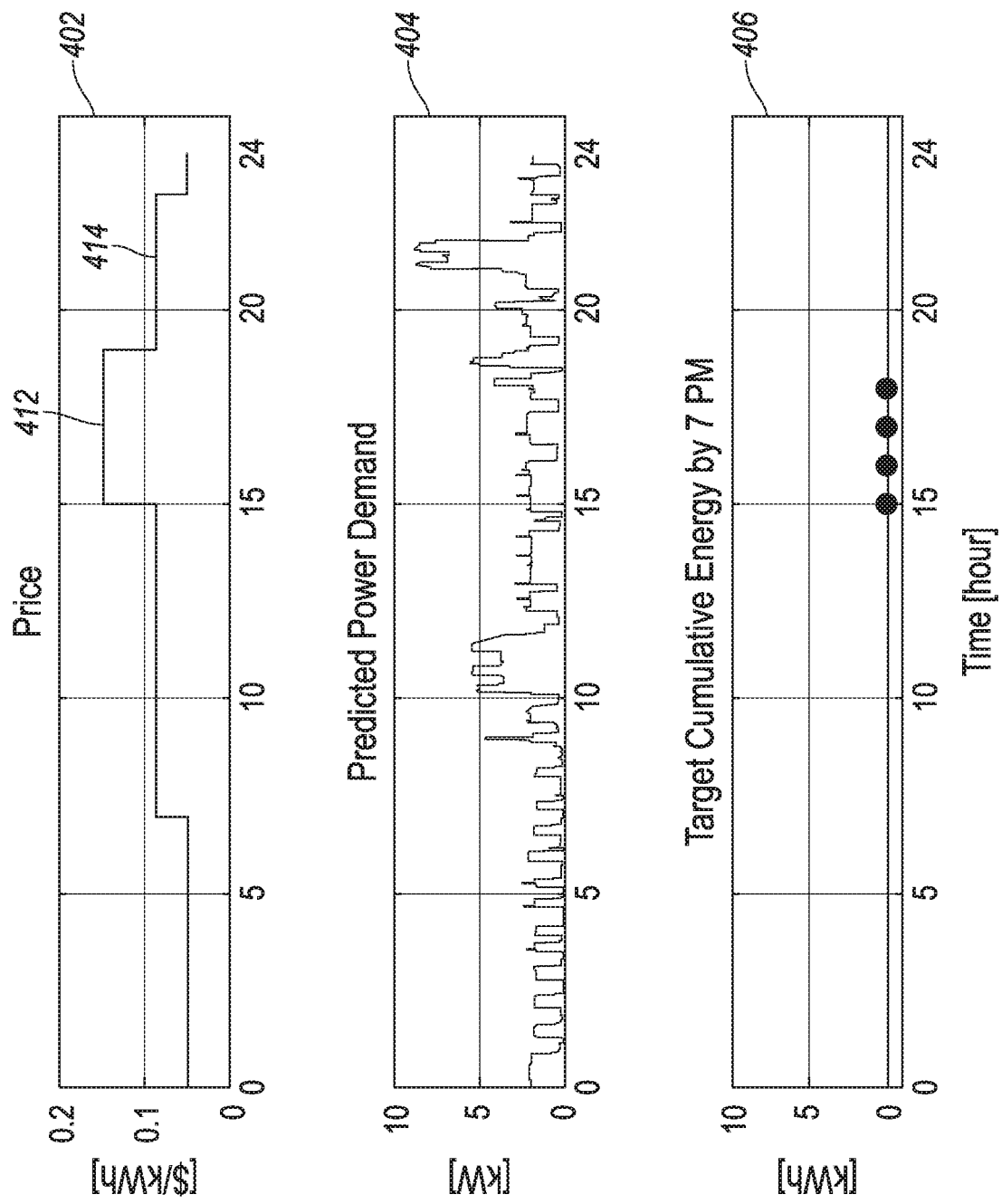
Figure 4D:
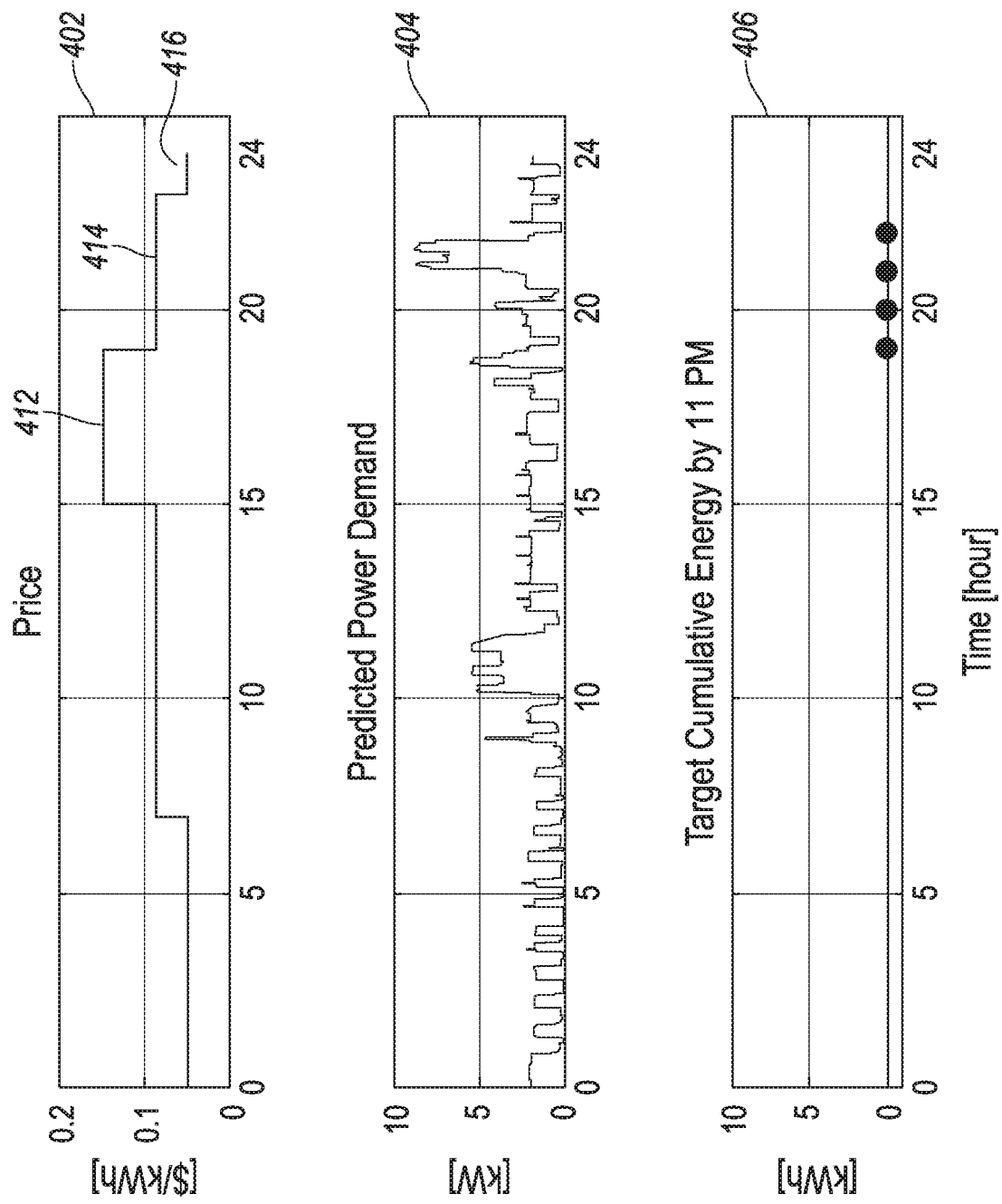

Referring to FIG. 4C, during the third period 412, the HEMS controller 212 determines the target cumulative energy at the end of the current period at 7 PM. As discussed above, since the energy price is the highest during the current period 412, the top priority of the HEMS controller 212 is to avoid drawing power from the grid during the period. Therefore, it may be unnecessary to reserve any energy for any of the subsequent periods. As illustrated in the energy diagram 406, the target cumulative energy by the end of the third period may be set to zero. Similarly, referring to FIG. 4D corresponding to the current period of the fourth period 414, the HEMS controller 212 may keep the target cumulative energy at zero by the end of the fourth period at 11 PM because the energy price during the subsequent fifth period is lower.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An energy system of a building, comprising:
a power storage device; and
a controller programmed to
during a period of time for which energy costs are lowest, charge a power storage device to a maximum state of charge, and
during a period of time for which (i) energy costs are not lowest and (ii) an immediate subsequent period of time is predicted to have higher energy costs, charge the power storage device to a target state of charge that is less than the maximum state of charge and that depends on predicted power demand during the immediate subsequent period of time.

2. The energy system of claim 1, wherein the predicted power demand depends on a duration of the immediate subsequent period of time.

3. The energy system of claim 1, wherein the controller is further programmed to charge the power storage device to maintain a state of charge of the power storage device greater than a minimum state of charge.

4. The energy system of claim 3, wherein the controller is further programmed to adjust the minimum state of charge based on a capacity of the power storage device or a maximum charging power of the power storage device.

5. The energy system of claim 1, wherein the controller is further programmed to, during a period of time for which (i) energy costs are not lowest and (ii) an immediate subsequent period of time is expected to have lower energy costs, preclude charging of the power storage device.

6. The energy system of claim 1, wherein the power storage device is a traction battery of a vehicle.

7. A method comprising:
during a period of time for which energy costs are lowest, charging a power storage device to a maximum state of charge,
during a period of time for which (i) energy costs are not lowest and (ii) a first immediate subsequent period of time is predicted to have lower energy costs, precluding charging of the power storage device, and
during a period of time for which (i) energy costs are not lowest and (ii) a second immediate subsequent period of time is predicted to have higher energy costs, charging the power storage device to a target state of charge that is less than the maximum state of charge and that depends on predicted power demand during the second immediate subsequent period of time.

8. The method of claim 7, wherein the predicted power demand depends on a duration of the first immediate subsequent period of time.

9. The method of claim 7 further comprising charging the power storage device to maintain a state of charge of the power storage device greater than a minimum state of charge.

10. The method of claim 9 further comprising adjusting the minimum state of charge based on a capacity of the power storage device or a maximum charging power of the power storage device.

11. The method of claim 7, wherein the power storage device is a traction battery of a vehicle.

12. An energy system for a building, comprising:
one or more power storage devices; and
one or more controllers programmed to, responsive to receiving a plurality of energy prices for a plurality of future periods, operate the one or more power storage devices such that energy stored in the one or more power storage devices is greater than a target minimum energy at a start of each of the plurality of future periods, wherein the target minimum energy at a start of each of the plurality of future periods is based on the plurality of energy prices and predicted power demands during one or more of the plurality of future periods.

13. The energy system of claim 12, wherein the one or more controllers are further programmed to adjust the target minimum energy based on a capacity of the one or more power storage devices or a maximum charging power of the one or more power storage devices.

14. The energy system of claim 12, wherein the one or more power storage devices include a traction battery of a vehicle.

\* \* \* \* \*